Aug. 15, 1933.　　　　G. MEZ　　　　1,922,971
MULTIPLICATION DEVICE
Filed Feb. 2, 1928　　　5 Sheets-Sheet 1

Fig.1

G. Mez
INVENTOR

Aug. 15, 1933.　　　　　　　G. MEZ　　　　　　1,922,971

MULTIPLICATION DEVICE

Filed Feb. 2, 1928　　　5 Sheets-Sheet 2

Aug. 15, 1933.    G. MEZ    1,922,971
MULTIPLICATION DEVICE
Filed Feb. 2, 1928    5 Sheets-Sheet 4

G. Mez
INVENTOR
By: Marks & Clerk
Attys.

Aug. 15, 1933.    G. MEZ    1,922,971
MULTIPLICATION DEVICE
Filed Feb. 2, 1928    5 Sheets-Sheet 5

G. Mez
INVENTOR

UNITED STATES PATENT OFFICE 1,922,971

MULTIPLICATION DEVICE

Gustav Mez, Dahlem near Berlin, Germany, assignor to Mercedes Buromaschinen-Werke, Aktiengesellschaft, Zella-Mehlis, Thuringia, Germany Application February 2, 1928, Serial No. 251,429, and in Germany February 5, 1927

29 Claims. (Cl. 235—63)

The invention relates to a multiplying mechanism for making shortened multiplications by addition, according to which, when setting the multiplier, the symbols are set which control the movements of the shift mechanism.

For carrying out these shortened multiplication methods, it is necessary, according to well-known practice, to supplement the multiplier, which is to be set, to its full tens, hundreds, thousands when the next lower digits i. e. units, tens, hundreds etc. have a higher value than 5, the excess of the supplement being then deducted again in the corresponding digits. This so-called double shortened multiplication method may be represented by figures for the multiplier 1689228 in the following manner:

```
        + 2,000,000
        −   300,000
        −    10,000
        −     1,000
        +       200
        +        30
        −         2
        ───────────
          1,689,228
```

If, for instance, a multiplicand is to be multiplied with the multiplier 1689228, this is effected by making two additive crank rotations in the million-digit, three subtractive crank rotations in the hundred-thousand digit, one subtractive crank rotation in the ten-thousand digit etc. so that instead of 36 crank rotations only 14 crank rotations are necessary whereby considerable time is saved. Machines, which operate according to this multiplication method, are already known. They operate according to the well known tens carrier mechanism in that the multiplying number roll of the next higher digit is shifted one unit when the multiplying number roll of the next lower digit is set to a value above 5. It is thus necessary as soon as the multiplier is set or adjusted to make the necessary shifting movements whereby the adjustment is rendered difficult and the machine is more complicated. On the other hand, it is known to attain the result with regard to the higher digit by a mechanical linkage of the keys but it is necessary to wait until the machine has made the calculation with the multiplying number before the key can be operated for the next number. Such adjustment, however, is useless for practical calculation and the linkage of the keys is too complicated for practical purposes.

Moreover, it has already been proposed when setting the multiplicator to adjust over a driving mechanism a symbol corresponding to the shortened method. The members controlling the calculating operations were gradually actuated during the calculating operation of the multiplier. The feeling members for working out the value of the symbol had to be moved out of their position of rest during the adjustment of each digit of the multiplier to the extent of the units corresponding thereto in the shortened method in order to cover the same distance to their position of rest when working off the symbol. According to this method, the driving mechanisms of the calculating machine were actuated as soon as the first multiplier key was depressed. This arrangement, however, was of a very complicated nature and too sensitive for practical purposes.

According to the present invention, means are provided which are of simple construction and insure a quick reliable operation. When setting the multiplier there is adjusted as a symbol for the said purpose only one stop for a feeling member which is arranged at a distance from the feeling member which corresponds to the value adjusted, the said distance being proportional to the symbols adjusted for the numerals 0–5 and vice versa proportional to the adjusted value for the numerals 6–9. According to this adjustment, other symbols are preferably adjusted simultaneously for controlling the calculating method. These symbols may be provided on a carriage which is fed or shifted according to the decimal point by the symbols. The key levers are also preferably constructed in such a manner that they are located opposite the corresponding symbols in their adjusting position and bring the same directly into operative position.

The invention will be more fully described by reference to the accompanying drawings showing embodiments of the principle of the invention by way of exemplification, without, however, limiting the scope of the invention to the particular construction shown. In the drawings Fig. 5 shows the key arrangement seen from above. Fig. 6b is a section on the line VIb—VIb of Fig. 6a. Fig. 9 is a diagrammatical representation of the different positions of the studs and of the feeling members in accordance with the multiplier hereinbefore mentioned. Fig. 12 is a detail of the key construction to be referred to. Figure 13 is a plan of the connection of the parts 59 and 62 which for the sake of clearness is not shown in Figures 1, 2 and 8. Fig. 14 shows the coupling in section on the line XIV—XIV of Fig. 15, said coupling being designated 73 in Figures 10 and 11. Fig. 15 is a section of the coupling according to line XV—XV of Fig. 14.

The invention is illustrated by way of exemplification in connection with the Mercedes-Euklid calculating machine (well known and for many years on the market) as described for instance in U. S. Patent 1,011,617, but it should, of course, be understood that the invention is not limited to this particular type of machine but it may as well be applied to calculating machine systems of other constructions.

The Mercedes-Euklid calculating machine, as is well known comprises a machine frame 1 (Fig. 1), the setting up slide 2, the setting up or driving mechanism underneath the slides of the known construction and for the sake of clearness not shown in the drawing and the carriage 3 for the registering or accumulating mechanism Z and the revolutions counter U. The aforesaid parts have the following reference characters in the said Patent No. 1,011,617, namely, 46, 47 and 48 for the setting up or driving mechanism and B for the carriage. The parts provided in the frame 1 and in the carriage 3 are, for the sake of clearness, not shown in the drawings. They are, however, identical with the parts which are provided in the parts designated A and B in the patent. In order to provide the calculating machine as described in the Patent No. 1,011,617 with the improvement, the calculating machine is mounted on a base 4 (Fig. 1) which extends forwardly with its part 4a under the carriage 3. The driving mechanism of the improvement is contained in the part of the base located below the calculating machine and the part 4a which extends forwardly under the carriage 3 contains the multiplier adjusting keys 5 and the key 6a, the object of which will be hereinafter explained. The projecting portion 4 moreover contains below the keys 5 the following device which extends over the entire width of the machine. A frame 7 (Fig. 2) is provided with the trunions 8 by means of which it is rockably mounted on the frame 1 at its side facing the frame of the machine, so that the frame 7 may be raised or lowered with relation to the keys 5 at its side disposed within the projecting portion 4. The transverse parts of the frame, shown at 9 are of U-shaped cross section (Figs. 2 and 6) and constitute sliding guides for the stud-carriage 10 which is provided with rollers 11 moving in these guides, so that the stud-carriage may be moved in the frame 7 and below the keys 5 in the transverse direction relatively to the machine. This stud-carriage 10 is acted upon by its spring 12 which tends to draw the carriage toward the left. By means hereinafter to be described the carriage is, however, normally retained in its right hand position shown in Fig. 2 of the drawings. The frame 7 is normally kept by a spring 13 in the upper position corresponding to Fig. 2 in which the keys 5 upon their depression will engage the studs 16—24 (Figs. 2 and 6) and produce the displacement of the carriage.

The frame 7 may, however, be retained in its lower position contrary to the operation of the spring 13 as hereinafter described by means of a hook 14 rockingly disposed on the projecting portion 4 and which is under the influence of a spring not shown which tends to move it in the anticlockwise direction, so that upon the depression of the frame 7 the hook will tend to catch the frame from above. If, however, the stud-carriage is moved from its left-hand position into the right-hand position corresponding to Fig. 2 the projection or shoulder 10a provided at the right-hand part of the carriage 10 becomes engaged with the hook 14 and rocks it in opposition to the action of its spring in the clockwise direction so that the hook will release the frame 7 permitting the frame to be moved into its upper extreme position shown in Fig. 2 of the drawing. The hook 14 is now laterally engaged with the frame 7, so that it is prevented from holding the frame downwards, and the frame will therefore remain in its upper position, even if a movement towards the left is imparted to the stud-carriage 10. By the depression of the key 6a the frame 7 may be returned to its lower position, provided the carriage has not assumed its right-hand position and the projection 10a is no longer in the path of movement of the hook, as the hook 14 may engage the frame from above and may keep it in its lower extreme position as already described.

Figure 2:
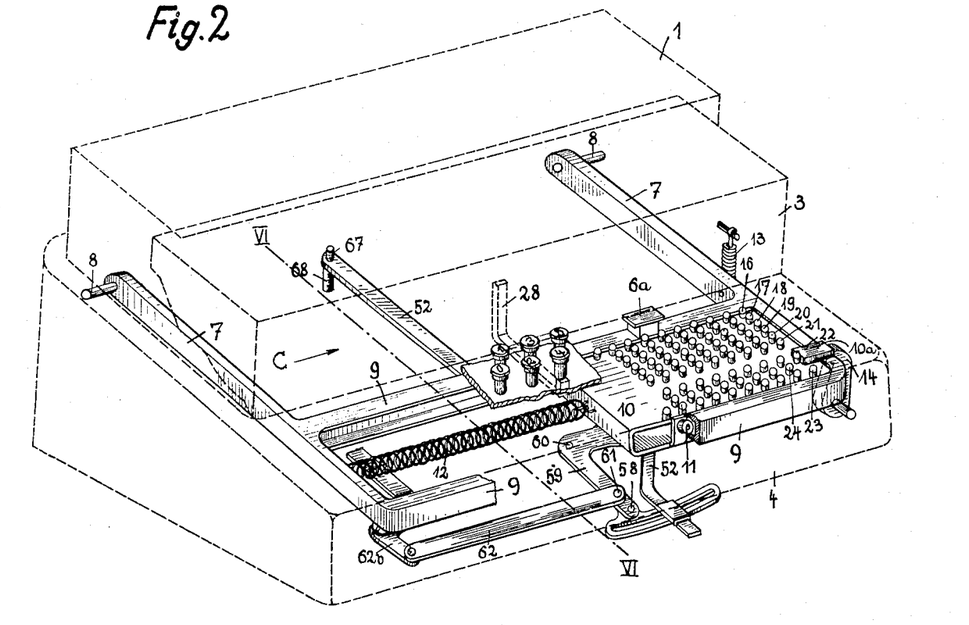
Fig. 2 is a perspective view, showing the mounting of the stud-carriage with the sliding frame, some of the parts being broken off for clearness of illustration, the stud locking pawls being omitted.
Figure 6:
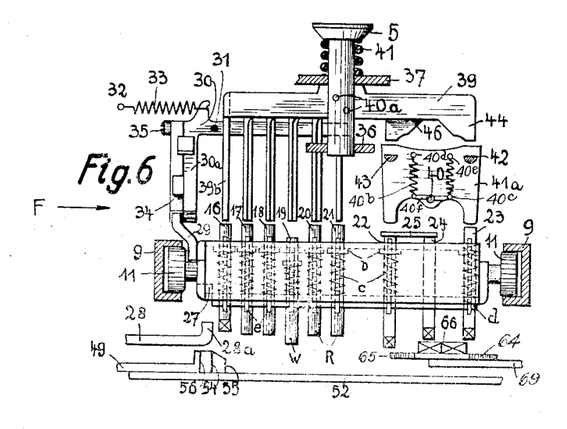
Fig. 6 is a section along the line VI—VI of Fig. 2 seen in the direction of the arrow C.
Figure 7:
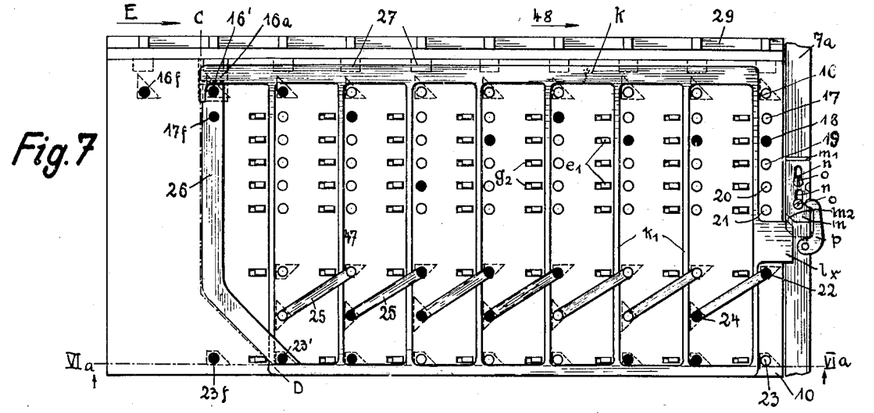
Fig. 7 is the top plan view of the stud-carriage without the keys and with the multiplier set for the quantity 1689228, the studs adjusted for this multiplier being indicated by solid black circles.

In the longitudinal direction of the stud-carriage 10 nine rows of studs 16—24 are provided as shown most clearly in Figs. 2, 6 and 7 of the drawings. The number of studs in each row is governed by the number of digits in the particular largest multiplier. In the exemplification shown a stud-carriage is illustrated adapted for a multiplier with eight digits.

Figures 5, 6B, 9, 12, 13, 14, 15:
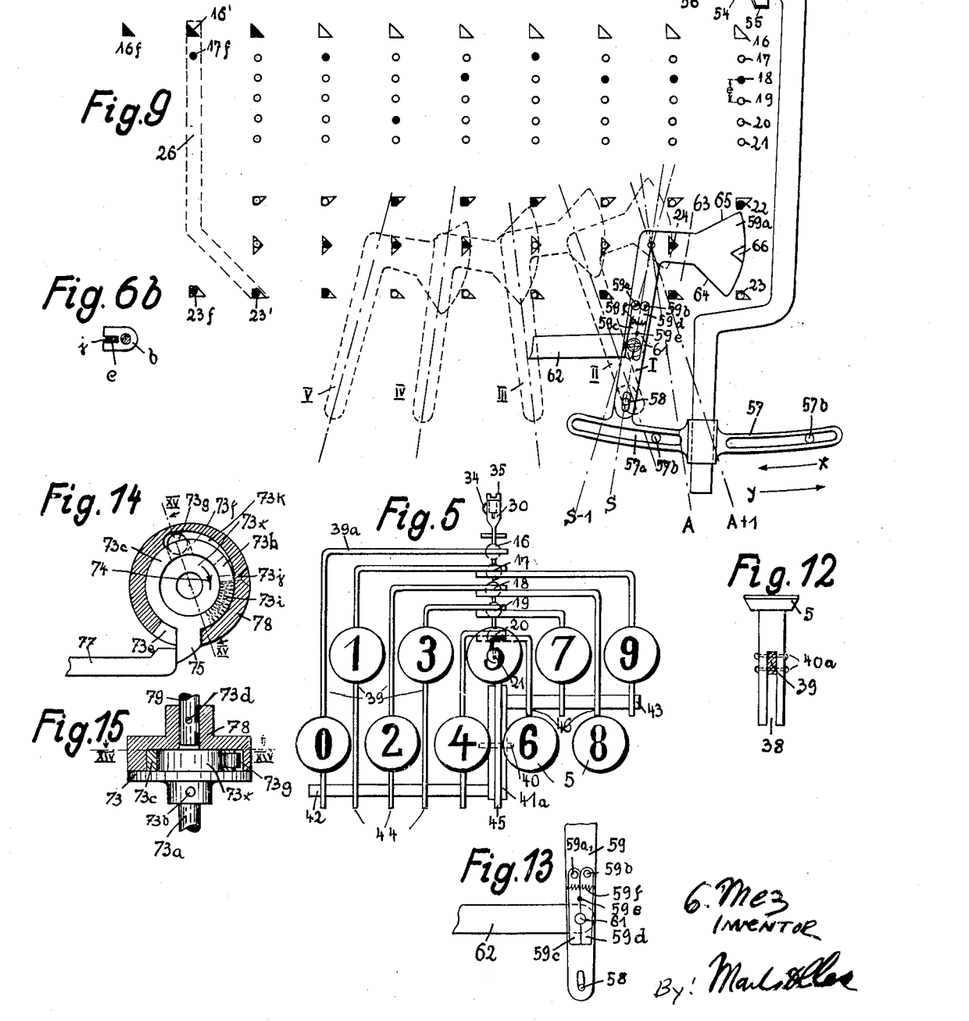
Figure 6A:
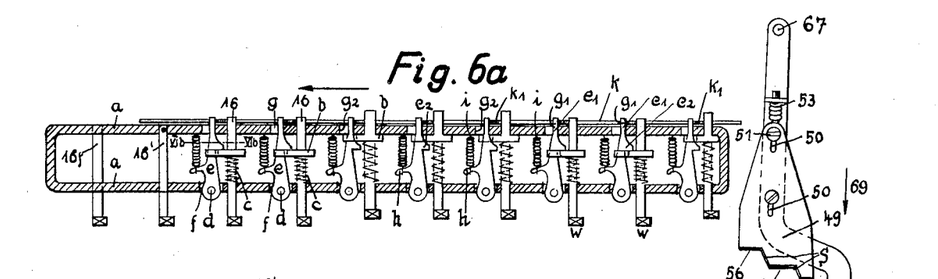
Fig. 6a is a longitudinal section through the stud-carriage on the line VIa—VIa of Fig. 7.

The stud-carriage shown in Fig. 6a comprises a hollow body composed of sheet metal plates a. The several studs are displaceably guided in bores of the upper and lower sheet metal plate of the stud-carriage and in order to produce the two different positions of the studs they are provided in this modification with a collar b. Between the collar b and the lower plate a of the stud-carriage a spring c is provided for each of the studs which keeps the stud normally in its position of rest shown at R in Fig. 6. At the side of each row of studs and upon the underside of the lower plate of the stud-carriage, shafts or pivots $d$ (Fig. 6 and Fig. 6a) are provided upon which the pawls $e$ are rotatably disposed. The pawls project into slots $f$ and $g$ of the lower and of the upper sheet metal plates. The pawls are under the action of springs $i$ secured to the projections $h$ of the pawls and the upper ends of which are attached to the underside of the upper sheet metal plate $a$. By means of the springs $i$ the pawls $e$ are always rotated clockwise, but they are normally prevented from such rotation by the engagement of their extensions $e^1$ with the edge $g^1$ of the slot $g$. The shafts $d$ may be loosely disposed in shallow grooves on the underside of the lower plate $a$, being retained in their position by the springs $i$ and by means of the pawls $e$. These pawls are moreover provided with lateral projections or shoulders $e^2$ which are normally engaged below the collar $b$ of the studs 16—24. Upon the depression of one of the studs the collar $b$ thereof acts upon the projection $e^2$ of its corresponding pawl $e$, rocking the pawl anticlockwise and in opposition to the springs $i$. After the collar $b$ has moved clear of the projection $e^2$, the pawl $e$ is again rocked clockwise by the spring $i$ and the projection $e^2$ snaps back over the collar $b$ of the depressed stud and retains it in the operating position indicated at "W" in Figs. 6 and 6a of the drawings. The collars $b$ of the studs are provided with the slots $j$ (Fig. 6b) by means of which the collars are constantly guided along the pawls $e$. By this means the rotation of the studs is prevented, which, as stated, should be avoided with several of the rows of studs.

Above the upper plate $a$ a grate $k$ (Figs. 6a and 7) is disposed the transverse bars $k^1$ of which are situated in the manner indicated in Fig. 6a in front of the extensions $e^1$ of the pawls $e$. Upon moving this grate in the direction of the arrow indicated in Fig. 6a of the drawings all the pawls $e$ are rocked contrary to the action of their springs $i$, so that the projections $e^2$ will release the collars $b$ of all the depressed studs, permitting them to be returned to their initial position of rest by the action of their springs $c$. In order to be able to release all the depressed studs either manually or automatically, when the stud-carriage is in its extreme right-hand position, the grate $k$ is provided with a projection $l$ (Fig. 7) in the path of movement of which a stop $m$ may be selectively made to move. This stop $m$ is displaceably arranged upon the right-hand bar $7a$ of the frame 7 by the action of a pin- and slot-connection $n$, $o$ and is ordinarily retained in the position corresponding to Fig. 7 by a spring-actuated lever $p$ adapted to engage with a corresponding recess. The stop $m$ is provided with a handle portion $m^1$ projecting through the cover-plate of the projecting extension 4. If it is desired to automatically cancel the depressed studs, when the stud-carriage 10 is in its right-hand position, it is merely necessary to move the slide $m$ into the position indicated in broken lines in Fig. 7. In order to permit the slide $m$ to move into this position, the slide as well as the projection $l$ are each provided with the inclined edges $m_2$ and $l_2$. In this case the grate $k$ is retained in the extreme left-hand position of the stud-carriage 10 in such a manner that all the pawls $e$ will rest against the edge $g_2$ of the slots $g$. By means of this arrangement it is possible to either cancel the adjusted multiplier, after it has been only once worked up for multiplication or to leave it in the adjusted position for repeated operations.

Figure 8:
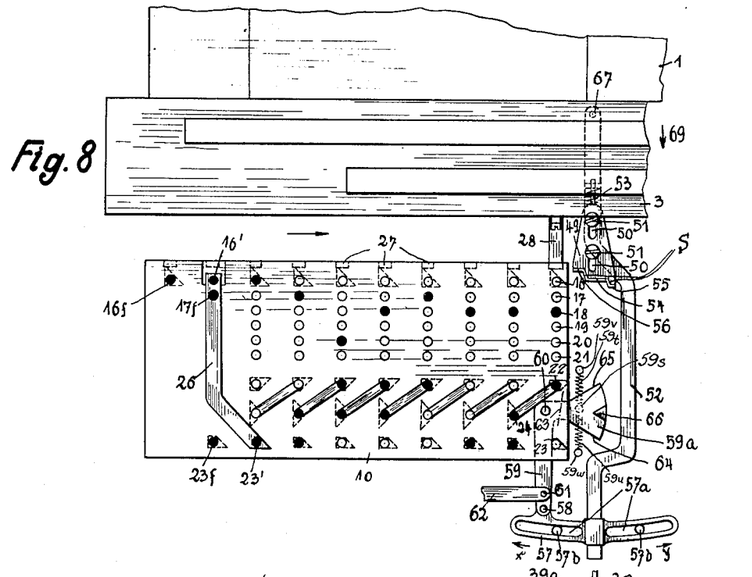
Fig. 8 is a diagram illustrating the respective positions of the machine frame, the counting carriage, the stud-carriage, the key arrangement and the feeling members relatively to each other after the setting of the multiplier 1689228 with the keys being shown separated in front of the stud-carriage which latter is shown separated from the counting carriage merely for purposes of clearness of illustration.

Those of the studs 16 which in the illustration according to Fig. 2 are shown farthest to the rear serve for the setting of the multiplier value "0". These ten studs are also shown in Fig. 8. They are of triangular shape, as appears from Figs. 6 and 7 of the drawings at their lower ends, so that they are adapted to produce a kind of wedge action upon parts of the machine hereinafter to be described, when the stud carriage 10 is moved to the right. The nine studs 17 in front of the studs 16 are of full cylindrical cross section and serve for the setting of the multiplier values "1" and "9". The zero stud farthest to the left in Fig. 7 is designated $16_f$ and this stud as well as the calculating stud $17_f$ are so arranged as to be fixedly disposed in their working position for reasons hereinafter to be explained, so that they are not displaceable in the stud carriage with relation to the other studs. It should be noted in this connection that the zero stud 16' cannot be set directly by the key 5. The purpose and function of these two fixed studs $16_f$ and $17_f$ will be more fully explained hereinafter. The other rows of studs 18—21 comprise each only eight studs of full cylindrical cross section. These studs 18 serve for the adjustment of the multiplier values "2" and "8", the studs 19 for the adjustment of the multiplier values "3" and "7", the studs 20 for the adjustments of the multiplier values "4" and "6" and the studs 21 for the adjustment of the multiplier values 5. The zero studs 16 (Fig. 6) are somewhat shorter than the other studs as far as the parts below the stud-carriage 10 are concerned, as will be described hereinafter.

The studs 16—21 hereinbefore described may be designated as calculating studs hereinafter, inasmuch as these studs, as will be more fully described, determine the number of crank rotations for the multiplier adjusted in the particular case. The other three rows of studs 22—24 will, however, be designated as controlling studs, because they are adapted to regulate or control the mode of calculation of the machine, that is to say, they are adapted to automatically reverse the driving action of the otherwise well known setting up or driving mechanism for addition and for subtraction respectively hereinbefore referred to upon the entering of the stud-carriage into a new decimal position.

Figure 7A:
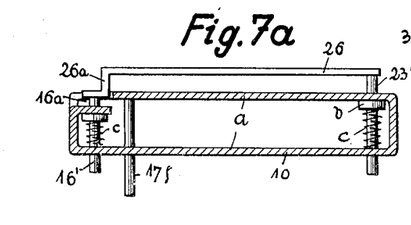
Fig. 7a is a section on the line C—D of Fig. 7 seen in the direction of the arrow E.

With this end in view the said controlling or switching studs are substantially wedge-shaped at their lower ends similar to the zero studs above described. The wedge shape of the different rows is however varying in view of the action produced thereby, and to be described hereinafter. The studs 22 switch the driving mechanism for subtraction, while the studs 23 switch it into the adding position. The studs 24 arranged intermediate these rows which in the following description will be designated as tens' switching or controlling studs, serve both as switching and controlling as well as calculating studs, inasmuch as they are adapted on the one hand to automatically change the position of the setting up or driving mechanism for addition and for subtraction respectively, and on the other hand, are likewise adapted to influence the main crank shaft, so as to cause it to make one rotation more or less than the calculating stud set in its particular decimal position. The tens'-switching studs 24 for structural reasons to be explained hereinafter are shorter than the other studs underneath the stud-carriage. Each subtraction-switching stud 22 of lower denomination is moreover fixedly connected to one tens' switching stud 24 of each higher denomination by means of a bar or connecting link 25 (Figures 6, 7 and 8). Moreover, the adding stud 23' of the highest full row of pins 16 to 24 is rigidly connected to the zero stud 16' of the next higher denomination by means of a bar or connecting member 26 (Figures 7, 7a and 8). The connecting bar or rod 26 (Figures 7 and 7a) is bent downwards a short distance to the rear of the fixed stud 17$^f$, so as to form a downwardly projecting part 26$^a$ to which the zero pin 16' is attached. By means of this arrangement the zero stud 16' can never be directly adjusted, inasmuch as this stud in its position of rest shown in Figure 7a, does not protrude above the stud carriage 10 as do the other studs. Its adjustment is only possible by way of the member 26 by the adjustment of the stud 23'. In order to make it possible for the zero stud to move to the depressed position, the stud-carriage is provided at this point with a recess 16$^a$ adapted for the reception of the angularly bent part 26$^a$ of the connecting member 26.

The adding stud 23$^f$ is fixedly disposed in its working position, similar to the zero stud 16$^f$ and the calculating stud 17$^f$. At the rear of each zero stud 16 a recess 27 is provided at the lower edge of the stud-carriage adapted for the engagement of the projection 28$^a$ (Fig. 6) of a spur or bar 28 (compare also Figures 2 and 8), provided the stud-carriage 10 has been rocked into its lower terminal position. When the stud carriage 10 is brought into its lower position by means of the key 6a, as stated above, the projection 28$a$ of the part 28 engages with the opposite recess 27 of the stud-carriage 10 and as the part 28 is secured to the carriage 3 of the counting mechanism, the stud-carriage 10 will also be positively moved during the movement of the carriage 3.

Figure 4:
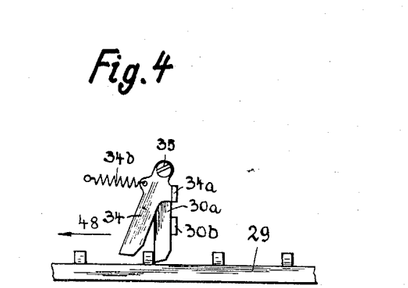
Figure 4 also shows a view of the parts 34, 30a and 29, the pawl 34 being shown in its swung out position.

To the upper edge of the stud-carriage 10 and behind the zero-studs 16 a rack-bar 29 is secured (Figures 6 and 7) of which the teeth are divided to correspond to the spacing of each two of the studs from each other. Above this rack bar and vertically below the multiplier key corresponding to the quantity 5 (Figs. 5 and 6) a switching or feeding rock-bar 30 is pivotally mounted on a pivoting stud 31 disposed on the machine frame 1 or on the projecting portion 4 thereof. This rocking lever 30 is ordinarily influenced in the anticlockwise direction by a spring 33 disposed between the lever 30 and the stud 32 secured to the machine frame 1. The said rocking bar 30 is preferably in the shape of an angular lever the downwardly directed leg 30$^a$ (Figs. 4 and 6) of which constitutes the fixed dog of an escapement mechanism. On the rocking lever 30 and in a well known manner a stepping dog 34 is mounted which participates in the rocking movement of the said rocking lever 30, but which, as shown in Figure 4, is adapted to swing out independently to a certain extent vertically to the swinging movement of the rocking lever 30. This escapement device which is of any suitable construction cooperates with the rack bar 29 only in case the stud-carriage is moving to the left from its right-hand position shown in Figure 2 in which the carriage as hereinbefore mentioned assumes its upper terminal position.

Upon the horizontal arm of the rocking bar 30 all the multiplier keys 5 (Figs. 5 and 6) are adapted to actuate upon their depression. The stems of the multiplier keys 5 are adapted to slide in the guides 36 and 37 (Figure 6). Each of the key stems is provided with a slot 38 (Figure 12) in which the levers 39 are secured by means of screws or pins 40$^a$. The keys 5 are retained in their upper position, in which they are confined by the levers 39, by means of the springs 41 which are disposed between the knob of the key and the guide plate 37. The lever 39 of the key which corresponds to the value "0" (Figure 5) is guided into the vertical plane of the row of studs 16 corresponding to the multiplier value "0", and at this point the lever 39 is bent to the right to form a leg 39$^a$ which extends beyond the horizontal arm of the rocking lever 30 and possesses a downwardly directed leg 39$^b$ (Figure 6) at right angle to the leg 39$^a$, the length of the downwardly directed leg 39$^b$ being so arranged that it will almost touch the zero-studs 16, provided the stud carriage 10 is in its upper terminal position and the zero studs 16 are in their position of rest. In order to provide for the possibility of the leg 39$^a$ extending past the horizontal arm of the rocking lever 30, the said leg is slotted or fork-shaped. The width of the slot is however less than the diameter of an adjusting stud, so that the lower end of the leg 39$^b$ becomes free to displaceably act upon the studs 16. But there is no absolute necessity of making the leg 39$^b$ of fork-shape, it being sufficient to provide it with a longitudinal slot adapted to admit of an oscillating movement of the horizontal arm of the rocking lever 30.

This arrangement of the system of levers starting with the multiplier key corresponding to the value "0" and extending to the zero keys 16 will also apply to the lever arrangement of the other multiplier keys with the exception of the multiplier-key corresponding to the value "5". The levers of the keys corresponding to the values "0" up to "4" are arranged to the left of the rocking lever 30, and the levers of the keys corresponding to the values "6" to "9" are arranged to the right of the rocking lever 30 in staggered or battery-like arrangement. The key corresponding to the value "5" however is disposed almost vertically above the rocking bar 30, so that it is only necessary to provide it with a sufficiently long stem the lower end of which will almost touch the studs 21, in order to adapt it for the operation of the row of studs 21 corresponds to said key. Besides the zero key and the five-key two complemental keys the values of which add to make the value "10" actuate upon one and the same row of studs, as for instance the keys of the values "1" and "9" act upon the studs 17, and the keys of the values "2" and "8" act upon the studs 18 and so on in succession (Figure 5).

Inasmuch as all the keys are adapted to be depressed for the same amount, while on the other hand the vertical stems 39$^b$ of the keys are differently spaced from the rotating axis of the rocking lever 30 which should always be rocked through the same angle, it becomes necessary to so adjust the longitudinal slots in the stem of the key for the value "5", and respectively in the legs 39$^b$, particularly in the upper part of the slots, in such a manner that the slot of the five-key upon the depression of said key will directly actuate to rock the rocking lever 30, while the slots of the legs 39$^b$ of the keys at the rear of the five-key should be so arranged as to become operative upon the rocking lever 30 somewhat later than said five-key, in order to obtain the same amount of rocking movement.

For the purpose of the setting or adjustment of the switching studs 22 to 24 a yoke 41ª is rockingly disposed on a stud-shaft 40 (Figures 5 and 6) above said studs, the yoke 41ª being retained in the position shown in the drawings by a spring arrangement. This spring arrangement consists of two springs 40b and 40c which are secured on the one hand to studs 40d and 40e of the yoke 41a and on the other hand to a cross arm 40f of the nonrotatable shaft 40. Owing to this arrangement, the yoke 41a is normally held in an intermediate position and may be swung either to the right or to the left. Upon the left hand side of the yoke 41a (Fig. 5) a shaft 42 is secured, while on the right hand side of the yoke 41a a shaft 43 is suitably secured. The shafts are so proportioned in length that they will project somewhat beyond the farthest keys of the key-board. The levers 39 (Fig. 5) of the keys corresponding to the values "0" to "4" are extended to the front side beyond the shaft 42 and at their projecting portions are provided with lugs 44 adapted to operate upon the shaft 42. In view of the fact that the key of the value "5" for the purpose of acting upon its studs 21 is not provided with a lever 39, as above set forth, this key for the purpose of acting upon the shaft 42 is only provided with a forwardly projecting lever 45 (Fig. 5) which lever is connected to the key by pins 40a (Fig. 12) in the same manner as the levers 39 are connected to their stems, the lever 45 being adapted to operate directly upon the yoke 41a by means of a lug which is similar to the lugs 44 of the levers 39. The levers 39 of the keys which correspond to the values "6" to "9", unless they are of such length and construction as to extend beyond the shaft 42, are guided so as to reach beyond this shaft 43 and carry lugs 46 by means of which they are adapted to act upon the shaft 43.

The cross section of the shafts 42 and 43 and the spacing thereof with relation to each other and with relation to the projecting lugs 44, 46 is preferably arranged in such a manner as appears from Fig. 6, that the shafts 42, 43 are adapted to move clear of the lugs 44, 46, when the yoke 41a happens to be rocked.

Thus, upon the depression of a multiplier key the following operations will be performed, that is to say (1) the calculating stud corresponding to the depressed key is adjusted; (2) in the case of the keys of the values "0" to "5" an addition-switching stud 23 is adjusted by means of the yoke 41a, while in the case of the keys of the values "6" to "9" a substraction-switching stud 22 is set by means of the yoke 41a and at the same time the tens-switching stud 24 connected to the stud 22 and disposed in the next higher digit is adjusted; and (3) the rocking lever 30 is operated.

In order to more fully explain the mode of operation of the part of the machine thus far described, particular reference will be made to the procedure in the adjustment of the multiplier 1689228. As already mentioned, the stud-carriage 10 at the beginning of a setting operation is in its right-hand position shown in Fig. 2 of the drawings, in which the carriage with the fixed zero stud 16$^f$ is disposed underneath the legs 39$^b$ of the keys or under the rocking lever 30. In this position the carriage is retained in opposition to the action of the spring 12 by the engagement of the stepping dog 34 (Fig. 3) with the rack bar 29. It will be assumed in this connection that the studs to be adjusted are to be again cancelled after having been worked up once. In view thereof the slide $m$ should first be moved into the position shown in broken lines in Fig. 7 of the drawings, by which means the grate or the cancelling plate $k$ is displaced in the direction indicated by the arrow in Fig. 6a so that all the pawls $e$ are thereby rendered inoperative with relation to their studs. There is accordingly no possibility of an adjustment of any of the studs in this position of the grate $k$; nor is this necessary, inasmuch as by the key first to be depressed none of the studs will have to be set, but merely a stepping movement of the stud-carriage 10 is produced towards the left. The cancelling plate $k$ is at the same time automatically returned to its position of rest by the action of the springs $i$. Now, in order to step the stud-carriage into the digit corresponding to the million-position (indicated at 47 in Fig. 7 of the drawings) the number-key corresponding to the value "0" is depressed three times. Since the zero-stud 16$^f$ has already been fixedly set in its operating position, there will be no stud-adjustment upon the first depression of the zero key, but merely a stepping forward of the stud-carriage for one position towards the left, which movement is produced by the rocking lever 30 in the following manner.

Figure 3:
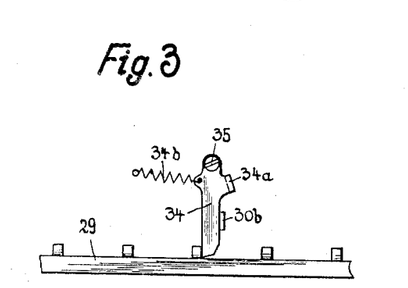
Figure 3 is a view of the parts 34, 30a and 29 in the position of rest seen in the direction of the arrow F of Fig. 6.

When depressing the zero key, the upper edge of the slot provided in its vertical member 39b (Fig. 6) acts on the rocking lever 30 whereby the stepping dog 34 is swung out of the rack bar 29 against the direction of the arrow F indicated in Fig. 6 so that it can follow the action of its spring 34b (Figs. 3 and 4) in the direction of the arrow 48 indicated in Figs. 4 and 7 until it bears with its lug 34a on the fixed dog 30a. Simultaneously with this rocking out of the stepping dog 34 from the rack bar 29 the fixed dog 30ª is rocked in the well-known manner into engagement with the rack bar, and will now operate instead of the stepping dog, to hold the stud-carriage 10. If the depressed key is now released, the lever 30 (Fig. 6) will be swung under the action of its spring 33 about its pivot 31 anticlockwise whereby the fixed dog 30a again releases the rack bar 29 so that the stud carriage 10 is drawn under the action of the spring 12 (Fig. 2) to the left (to the right in Fig. 4) whereupon the next tooth of the rack bar 29 moves against the loose dog 34 and takes same along against the action of its spring 34b until it bears against the part 30b of the fixed dog 30a as shown in Fig. 3, whereby the stud carriage 10 with its next lower row of studs 16 lies opposite the projection 39b of the key lever 39. Inasmuch as during this procedure the cancelling plate $k$ with the stud-carriage has also been moved towards the left, its projection $l_x$ has become disengaged from the slide $m$, so that the plate $k$ under the action of the springs $i$ has become free to return to its position of rest contrary to the direction indicated by the arrow in Fig. 6a, so that now upon the depression of any of the studs the particular stud will be retained in its depressed position by its corresponding pawl $e$. By repeating the depression of the zero-key, and in view of the fact that the zero-stud 16$^l$ is not directly adjustable the stud-carriage is also merely fed towards the left for the distance of one decimal order.

Simultaneously with these two stepwise feeding movements the lug 44 of the lever 39 of the zero-key has also caused the operation of the yoke 41a by way of the shaft 42. Inasmuch, however, as the zero-stud 16$^f$ is not associated with an adding stud 23, and inasmuch as the adding stud 23ᶠ corresponding to the zero-stud 16' is fixedly disposed in its working position, the resulting rocking movement of the yoke 41a has no disturbing influence. After the stud-carriage 10 has become disposed in the ten-million position, the zero-key is again depressed. This causes the correspondingly located zero-stud 16, and by means of the lug 44 and the yoke 41a the corresponding adding stud 23' of this digit, and moreover the zero-stud 16' by means of the connecting bar 26, to be adjusted, whereupon the stud-carriage is again moved one step towards the left and has now reached the million position, the said studs being retained in their depressed positions by their corresponding pawls e.

By the depression of the key corresponding to the value "1" the calculating stud 17 disposed in this position and the corresponding adding-stud 23 are adjusted, the adding-stud being operated by way of the lug 44 of this particular key and the yoke 41a, which studs are retained in their depressed positions by their pawls e, whereupon the stud-carriage is again swiftly moved one step towards the left into the hundred-thousand digit. In this position the key corresponding to the value "6" is depressed, whereupon the calculating stud 20 becomes adjusted and is retained in its depressed position by its corresponding pawl e. The lug 46 of this key acts upon the shaft 43 of the yoke 41a and in consequence thereof a subtraction stud 22 is adjusted and attained in the depressed position by the corresponding pawl e, and inasmuch as this stud is fixedly connected by the connecting member 25 to the tens' switching stud 24 of the next higher digit, this switching stud 24 is likewise depressed and is arrested in its depressed position by the corresponding pawl e. After releasing this key the stud-carriage 10 will be swiftly moved one step towards the left.

This procedure is repeated until the stud-carriage 10 has assumed its extreme left-hand position in the frame 7 (Fig. 2) or until the number 8 in the unit digit of the multiplier to be set has become adjusted in the stud-carriage, whereupon this carriage will again jump one step towards the left, so that therefore after the adjustment has been effected, the row of studs of the stud-carriage farthest to the right becomes disposed one digit to the left of the rocking lever 30 as appears from Fig. 8 of the drawings. The calculating and switching or regulating studs which are in their operating positions after the adjustment of the above mentioned multiplier are shown in black in Figs. 7, 8 and 9 of the drawings.

Thereupon by the depression of the operating key 6a the frame 7 is rocked into its lower terminal position in opposition to the action of the spring 13 (Fig. 2) and is retained in its lower position by the hook 14 (Fig. 2) in which position the spur or stirrup 28 (Figs. 6 and 8) with its lug 28a will become engaged with the recess 27 opposite the same. By the engagement of the member 28 with the confronting recess 27 the stud-carriage 10 has become locked to the counting-carriage 3, so that it will partake in its movements.

The studs 16—24 which are thus set now serve for controlling the movements of the setting up or driving mechanism which are to be made in each digit in accordance with the shortened or abbreviated multiplication method, the said mechanism being moved once during each rotation of the shaft 91h. This shaft is designated by the numeral 53 in U. S. Patent 1,011,617. One begins with the lowest digit of the multiplier set in the stud carriage 10. According to the set multiplier 1689228 and the multiplication method described in the preamble, two subtractive movements of the setting up or driving mechanism would first of all have to be made in the unit position, then additive movements in the tens position, additive movements in the hundreds position, et cetera. It is to be borne in mind that in the machine according to U. S. Patent 1,011,617 the subtraction is made by adding the complement number of the subtrahend. The shaft 91h rotates always in the same direction during addition and subtraction while the adding and subtracting operations of the setting up or driving mechanism are effected by reversing the lever 62g which is designated by the numeral 3 in U. S. Patent 1,011,617.

The set studs 16—24 represent the symbol for the number of revolutions of the shaft 91h and for the reversing direction of the lever 62g.

In order to obtain through this symbol the necessary shifting movements, a feeler is provided which cooperates with the set studs. This feeling device is preferably operated upon the rocking of the frame 7. The device comprises a feeler 49 (Figs. 8–11) mounted below the stud-carriage 10 and disposed in the same vertical plane with the rocking lever 30. The feeler is provided with longitudinal slots 50 into which a bar 52 (Figs. 9, 10 and 11) is adapted to engage by means of screws 51 disposed in the bar 52, so that the feeler 49 is displaceably retained upon the bar 52. The feeler is normally kept in the position shown in Figs. 8 and 9 by means of a compression spring 53 which rests against the feeler and on the other hand bears against the projection of the bar 52.

Figure 1:
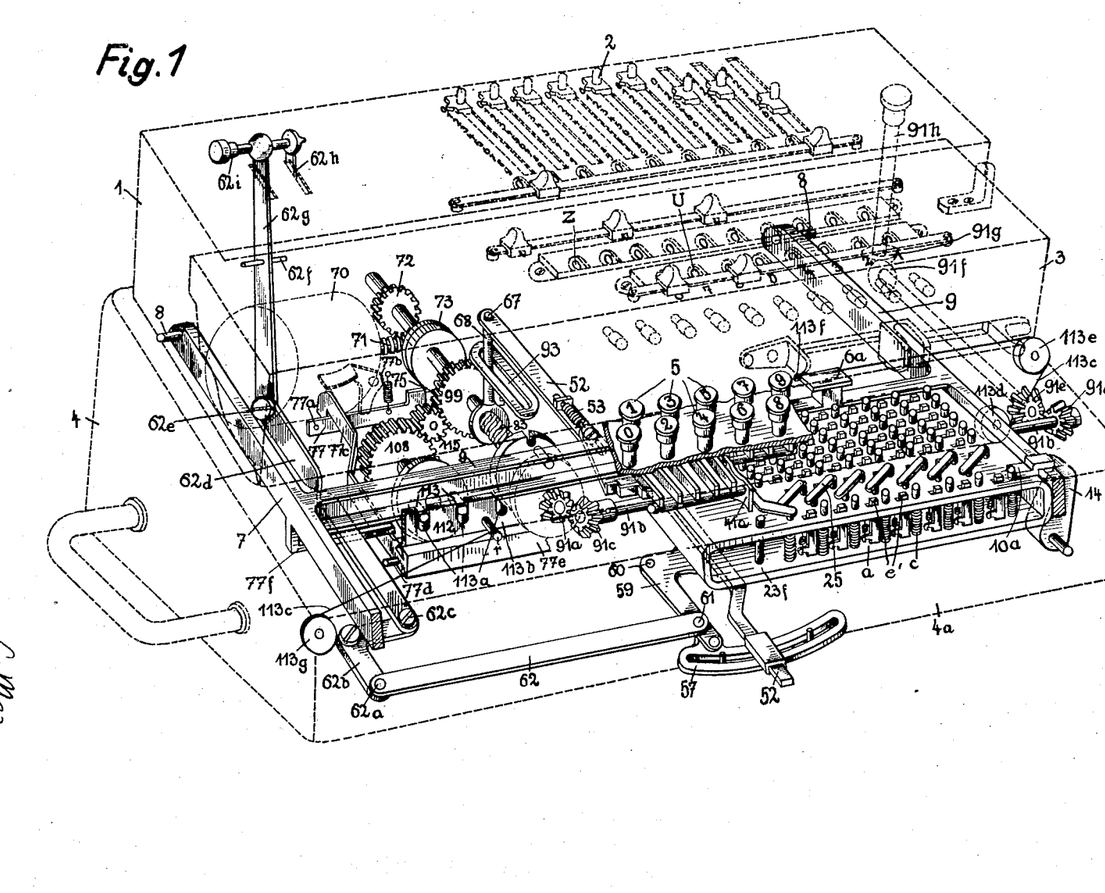
Fig. 1 is a perspective view of an entire calculating machine according to this invention.
Figure 10:
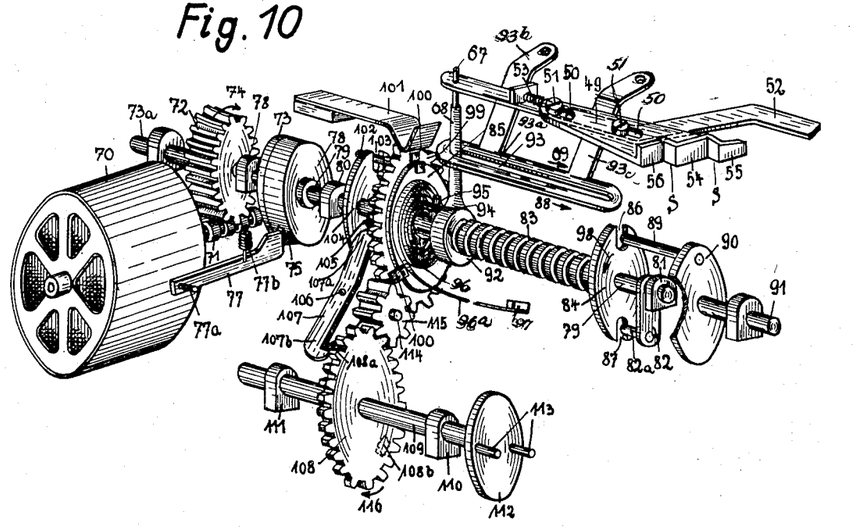
Fig. 10 shows the position of the driving mechanisms in the position of rest.
Figures 11, 16:
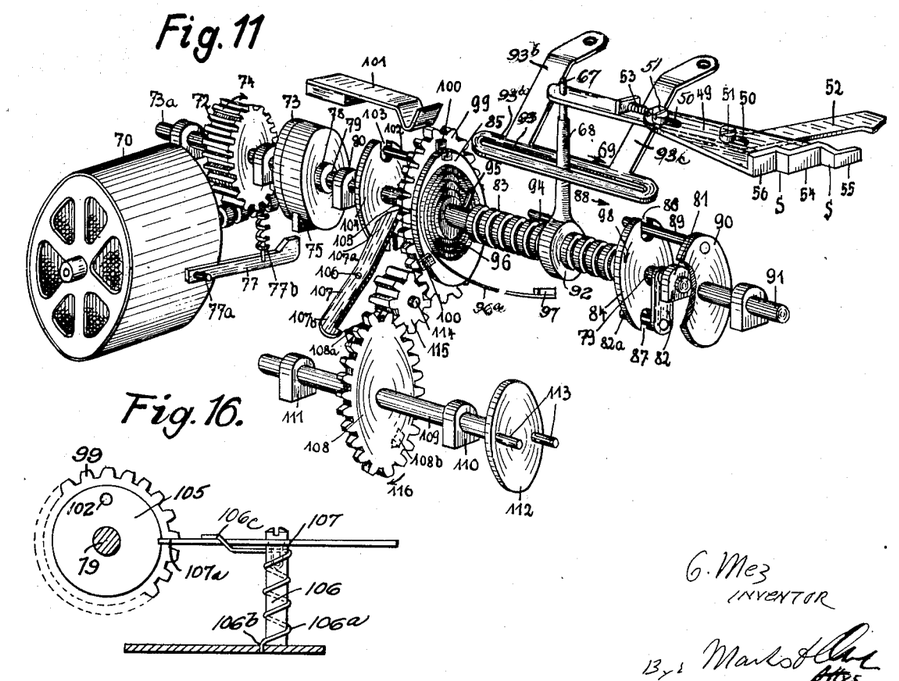
Fig. 11 illustrates the position of the driving mechanisms after the feeding of the counting carriage and after several rotations of the main shaft operating the feeding mechanism.
Figure 16 is a detail view as seen looking toward the left of Figs. 10 and 11 of the gear wheel 99 and lever 107.

The feeler 49 possesses a substantially central impinging broad surface 54 and two narrower impinging surfaces 55 and 56. The surface 55 projects forward with relation to surface 54 for the distance of one division of studs e (Fig. 9), while the surface 56 recedes from the surface 54 for the distance of one division of studs. The surface 55, as appears from Fig. 10 is moreover somewhat lower than the surfaces 54 and 56, which will be more fully described hereinafter. The surfaces 54, 55 and 56 are connected to each other by inclined surfaces S (Figs. 10 and 11). The bar 52 is forwardly extended (Figs. 2 and 8) and is there displaceably journalled in a member 57 (Figs. 2, 8 and 9). This member 57 is provided with slots 57a curved on a circular arc. The respective circular arcs are described on the pivoting center 67 of the bar 52 which pivoting point is kept in the position of rest. With these slots fixed studs 57b are adapted to engage and to guide the part 57, when it is moved in the direction of the arrows x or y (Fig. 9). This part 57 is linked at 58 by a pin-and-slot-connection to a segment 59 operating as an angular lever and adapted to be rocked in the horizontal plane on a pivot 60 fixedly secured in the projecting portion 4 of the frame. This segment 59 is usually maintained in its middle position shown in Fig. 8. For this purpose, a downwardly extending stud 59s is riveted to the part 59a of the segment 59, with which stud two springs 59t and 59u engage which are secured to studs 59v and 59w. For the sake of clearness, this spring arrangement is not shown in Figure 9. To the lever 59 at points 59a and 59b two levers 59c and 59d are linked, so as to be freely rotatable and in their middle portion they surround a stud 59e secured to the lever 59 and against which the levers 59c and 59d are adapted to bear by means of a tensional spring 59f. Between the lever 59 and the levers 59c and 59d a bar 62 is arranged the pin 61 of which is surrounded by parts of the lever 59c and 59d. By means of this arrangement the bar 62 is likewise moved following a movement of the lever 59; as soon as the bar 62 encounters, however, a resistance in one or the other direction, the spring 59f will yield, so that the lever 59 is free to move independently of the bar 62. At its other end the bar 62 as shown in Fig. 1 of the drawings is linked at 62a to an angular lever 62b rotatably mounted in the machine frame to which lever 62b at the point 62c a pitman rod 62d is pivotally connected and which at the point 62e is rotatably connected to the lever 62g rockingly disposed at 62f. This lever is indicated in U. S. Patent 1,011,617 (Figs. 2, 3, 5 and 29) at 3 and serves for the operation of the setting up or driving mechanism for addition and for subtraction respectively. In this previous patent the lever 3 is associated with a lever 29 (Figs. 3, 7 and 29) which serves for the operation of the revolutions counter for the purpose of addition and of subtraction respectively and in the specification herein submitted is indicated at 62h. Inasmuch as the operation of these two levers have been described in detail in the previous patent referred to and inasmuch as they do not constitute the subject matter of this invention, more detailed description of these members has been omitted in this specification. It should only be noted that the lever 62g and the lever 62h are coupled to each other by means of a stud 62i (Fig. 1), so that the movements communicated to the lever 62g by the lever 59 can also be transmitted to the lever 62h. In view thereof, when the setting up or driving mechanism has been set for addition by the lever 62g, the lever 62h will also set the revolution counter for addition; and when the lever 62g sets the setting up or driving mechanism for subtraction, the lever 62h will also set the revolutions counter for subtraction.

The sector 59 is provided with a broad surface 59a and is crank-shaped or offset at the line 63 (Fig. 9), so that the entire surface 59a is situated at a higher horizontal level than the remaining part. By this means the result is accomplished that the part 59 does not interfere with the switching or controlling studs 23, when they are in their operating position and the stud-carriage 10 is in its lowest position, while the part 59a is disposed in the path of the studs 22 and 23. In order that these studs may exert a shifting action on the sector when the stud-carriage 10 moves to the right, the part 59a is provided with sliding surfaces 64, 65 of which the surface 64 is adapted to be acted upon by the addition switching studs 23 and the surface 65 by the subtraction switching studs 22. Inasmuch as the tens'-switching studs 24 cannot act directly upon the part 59a, they are somewhat shorter below the stud-carriage than the switching or controlling studs 22 and 23, as already mentioned, for such an amount that the said studs 24 in their operating position and with the stud-carriage 10 in the depressed position cannot touch the part 59a any more. Upon the movement to the right of the stud-carriage 10 said studs 24 are adapted to act upon the lug or shoulder 66 provided on the part 59a, and by this means they can effect the rocking of the sector or segment 59.

The bar 52 is linked by means of a stud 67 (Figures 2, 8, 9, and 10) to an arm 68 of an adjusting nut, and by means of this nut the operation of which will be more fully described hereinafter the bar 52 may be displaced from its position of rest shown in Figure 8 in the direction of the arrow 69. The driving means serving for the displacement of the adjusting nut and for the displacement of the counting-carriage 3 and of the stud-carriage 10 coupled therewith are the following:—

There is mounted below the machine casing 1 (Fig. 1) and within the base 4 the motor 70 whose revolutions are transmitted over the worm gear 71, 72 (Figs. 10 and 11) to the shaft 73a in the direction of the arrow 74 (Figs. 10 and 14) to which the disc 73 is secured by stud 73b (Fig. 15). The disc 73 bears with one side on the part 78 which is secured to the shaft 79 by stud 73d. There is rotatably mounted in the part 78 a ring 73c which bears a lug 75 extending through a recess 73e of the part 78. A lug 73x on the disc 73 and on which (lug) the ring 73c is rotatable extends into the latter. In a recess 73f of the ring 73c a roller 73g is movably mounted, the diameter of which exceeds the width of the ring 73c. A spring 73i is provided in a recess 73h of the ring 73c similar to the recess 73f, said spring bearing on the one hand against one end of the recess and on the other hand against a rivet 73j secured in the part 78 and extending into the recess 73h. The part 78 is provided on the inner periphery with an eccentric cam 73k. If the lug 75 of the ring 73c is released by the lever 77, the spring 73i turns the ring 73c in the direction of the arrow 74 indicated in Fig. 14 and clamps the roller 73g between the part 73x (also rotating in the direction of the arrow indicated in Figure 14) and the eccentric cam 73k, whereby the part 78 and the shaft 79 also participate in the rotation of the shaft 73a and the part 73x in the direction of the arrow 74. If the lever 77 is again brought into the path of the lug 75, the spring 73i will be compressed, whereby the roller 73g will also be brought into the wide part of the cam 73k and a further rotation of the part 78 and the shaft 79 no longer takes place. The lever 77 is rotatably mounted at the point 77a (Fig. 1) and is normally rocked anticlockwise by a spring 77b but is prevented from carrying out this rocking movement by the lever 77c above the lever 77, and is retained by means thereof in the position shown in Figures 1 and 10 in which it prevents any possible rotating movement of the lug 75. The lever 77c which for the sake of clearness is not shown in Figures 10 and 11 is secured to a bar 77e rotatably mounted on two studs 77d (only one of which is shown for the sake of clearness of illustration) in the frame of the machine. The lever 77c is adapted for operative engagement by a stud 77f fastened to the frame 7. Upon a depression of the frame 7 by means of the key 6a hereinbefore mentioned the stud 77f is forced against the lever 77c and inasmuch as this lever acts upon the lever 77, this latter lever is rocked into the position shown in Figure 11 contrary to the action of its spring 77b and by this means the coupling 73 is released and the clutch may be closed and engaged as stated above, whereby the shaft 79 is set in rotation which is rotatably mounted at 80 and 81 and carries on its right end the lever 82.

Upon the shaft 79 sleeve 83 is rotatably and displaceably disposed which is provided with exterior threads and at both of its ends is provided with the discs 84 and 85 fixedly secured thereto. The disc 84 is provided with diametrically opposite openings or recesses 86 and 87. With the recess 87 upon the displacement of the sleeve in the direction of the arrow 88 the projection lug 82a of the tappet 82 is adapted to become engaged, while with the other recess 86 a stud 89 becomes engaged which is secured to the disc 90. This disc is keyed to the shaft 91 upon which a bevel wheel 91a is also secured engaging with a bevel wheel 91c secured to the shaft 91b. Upon the other end of the shaft 91b a bevel wheel 91d is secured which, by way of the bevel wheels 91e, 91f and 91g drives the crank shaft 91h which latter element corresponds to the crank shaft designated by the numeral 53 in United States Patent 1,011,617 and serving to drive the setting up or driving mechanism.

Upon the sleeve 83 a displaceable nut 92 is disposed which is provided with an arm 68 guided in a slot 93 of a part 93a fixed by ears 93b and 93c to the cover of the base 4. To the arm 68 as already mentioned the bar 52 is pivotally connected. Upon the movable nut 92 a stud 94 is secured which cooperates with a stud 95 (Figure 11) secured to the nut 83 near the disc 85. Between the stud 95 and the disc 85 a watch spring 96 is arranged one end of which is fastened to the sleeve 83, while its other end is secured at 97. Inasmuch as the sleeve 83 is displaceable and the spring is compelled to participate in the displacing movements off of the sleeve 83, it is necessary that the fastening means 97 should also be displaceable along therewith. Since however the sleeve 83 need only be displaced a short distance in the direction of the arrow 88 i. e. only from the position according to Figure 10 into the position according to Figure 11, it is sufficient that the end 96a of the spring 96 is of adequate length and secured at 97 to the bottom of the base 4. There is preferably inserted between the stud 95 and the spring 96 a disk which for the purpose of rendering the spring 96 visible is not shown in Figures 10 and 11. Owing to the length of the end 96a of the spring 96 the latter is readily adapted to participate in the short displacing movement of the sleeve 83. The spring 96 is adapted to impart a rotating movement to the sleeve 83 in the direction of the arrow 98, but this rotating movement is counteracted and prevented in the position of the sleeve shown in Fig. 10 of the drawing by the cooperation of the studs 94, 95 and in the position of the sleeve 83 shown in Fig. 11 of the drawings by the cooperation of the slot 87 with the tappet 82. The sleeve 83 can therefore only be rotated by the spring 96, in case it is released both by the stud 94 as well as released from the tappet 82 and the stud 89.

At one side of the disc 85 and likewise loosely and rotatably arranged upon the shaft 79 a gear wheel 99 is disposed which is provided with three clawing members 100 adapted to loosely surround the disc 85, whereby the gear wheel 99 becomes rotatably but undisplaceably disposed with relation to the sleeve 83. The gear wheel 99 and consequently the sleeve 83 are ordinarily retained in the position shown in Fig. 10 by a flat spring 101. In this position the stud 102 secured to the gear wheel 99 becomes adapted to engage with an opening or a recess 103 of a disc 104 keyed to the shaft 79. Upon the hub 105 of the gear wheel 99 one end 107a of a lever 107 is adapted to bear which is rockable in the horizontal plane on the shaft 106, fixed to the bottom of the base 4 (Fig. 10). The lever arm 107a is constantly kept in contact with the hub 105 by means of a torsional spring 106a surrounding the shaft 106 and attached with one end 106b to the bottom of the base 4 and acting with the other end 106c on the lever arm 107a. The other end 107b of the lever 107 in the position corresponding to Fig. 10 of the drawings becomes disposed in the path of the cams 103a and 108b, which are secured to a gear wheel 108. This wheel is keyed to a shaft 109 which is rotatably journalled in the bearings 110 and 111. Upon the end of the shaft 109 at the opposite side with relation to the gear wheel 108, a disc 112 is secured carrying two studs 113. Between the gear wheels 99 and 108 a shaft 114 is rotatably mounted upon which a gear wheel 115 is secured. With the gear wheel 99 in the position coresponding to Fig. 10 of the drawing every rotation imparted to the gear wheel 99 in the direction of the arrow 74 will also be communicated to the gear wheel 108 which is thereby rotated in the direction of the arrow 116.

In pursuance of this rotating movement the disc 112 is also rotated in the direction of the arrow 116, so that the studs 113 secured thereto and which are adapted to engage with the notches 113a (Fig. 1) of the bar 113b will produce a displacement of this bar. For this purpose the bar 113b is displaceably mounted by means of dovetail-guide in the bar 77e and in view of this arrangement the bar 113b is adapted to participate in every rocking movement of the bar 77e. To a stud r secured to the bar 113b a chain 113c is secured which is guided over the rollers 113d and 113e and the other end of which is secured to the counting carriage at 113f. The counting carriage 3 is retained in its terminal left-hand position shown in Fig. 1 of the drawings by means of a spring casing or the like, not shown in the accompanying drawings for the sake of clearness of illustration, but more fully illustrated in U. S. Patent 1,011,617 and therein designated by the numeral 23. If now the stud carrying disc 112 is rotated in the direction of the arrow 166 of Fig. 10, the bar 113b in accordance with the representation of Fig. 1 of the drawings is moved to the left by the studs 113 and in consequence thereof the counting carriage 3 is moved to the right by means of the chain 113c and contrary to the action of the spring casing above referred to. This will, however, only occur in case the studs 113 are in engagement with the notches 113a of the bar 113b. If the stud carriage 10 is in its upper position, the studs 113 are disengaged from the notches 113a. If, however, the stud carriage 10 is depressed into its lower position by means of the key 6a, the stud 77f secured to the left-hand side of the frame 7 becomes engaged with the lever 77c and causes the rotatably mounted bar 77e and in pursuance thereof the bar 113b to be rocked towards the stud disc 112 and by this means the studs 113 will become engaged with the notches 113a of the bar 113b. The said bar 113b is under the influence of a spring drum 113g (Fig. 1), the spring of which is connected by a chain or the like to the stud r of the bar 113b and tends to move it towards the left.

For the purpose of feeding the counting carriage through the space of one digit half a rotation of the gear wheel 108 will be sufficient, and towards the end of this half rotation the cam 108b which is moving towards the end 107b of the lever 107 will operate this lever and rock it in the clockwise direction and by this means its lever arm 107a acts upon the hub 105 of the gear wheel 99 and causes this wheel to be displaced and to assume the position shown in Fig. 11 in which the stud 102 has become disengaged from the recess 103 of the disc 104, while the studs 82a and 89 have entered the recesses 86 and 87 of the disc 84.

The mode of operation of these parts of the device and their cooperation with the studs which have been adjusted on the stud carriage are substantially as follows: After the unit position of the multiplier 1689228 has been set on the stud carriage it will have assumed its extreme position to the left shown in Fig. 8, as hereinbefore specifically described, that is to say, one digit to the left of the feeler 49. Upon now depressing the corresponding key 6a in this position of the stud carriage 10 the frame 7 and consequently also the stud carriage, as above explained, are rocked into their lower position in which these parts are retained by the hook 14 (Fig. 2). During this rocking movement the stud carriage 10 has also become simultaneously coupled with the counting carriage 3 by means of the spur or stirrup 28 (Fig. 8). Furthermore by means of the stud 77f of the frame 7 the lever 77c has become depressed at the same time and in consequence thereof the notches 113a of the bar 113b have become engaged with the studs 113 of the disc 112, while on the other hand, by means of the action of the lever 77c upon the lever 77 this latter lever has become rocked from its position shown in Fig. 10 and has assumed the position according to Fig. 11, by which means, as above described, the closing and engagement of the coupling means 73 will be effected.

Inasmuch as during this procedure the gear wheel 99 is now in the position according to Fig. 10 of the drawing, the gear wheel 108 will be operated by means of the gear wheel 115, which will cause the counting carriage 3 with the stud carriage 10 to be moved towards the right through the space of one digit from its position shown in Fig. 8 and into the position corresponding to Fig. 9, so that the row of studs of the unit digit will become disposed in the path of the feeler 49. Shortly before the termination of the stepwise movement, however, the stud 22 for adjusting the subtraction, has moved along the sliding surface 65 of the sector 59a, and by this movement has rocked this sector and its arm 59 into the position "S" represented in full lines in Fig. 9 and indicated at "I", and by this means, as above described on the one hand the setting up or driving mechanism and in the same manner the revolutions counter of the calculating machine has become reversed into the subtracting position by means of the bar 62, and on the other hand, the bar 52 and consequently the feeler 49 by means of the arm 57 has been rocked into the position indicated in Fig. 9 of the drawings in which the surface 54 of the feeler 49 is opposite the unit value "8" represented by the adjusted stud 18. Immediately after these several movements have been terminated, the cam 108b of the gear wheel 108 rocks the lever 107 away from its position shown in Fig. 10 and moves it into the position corresponding to Fig. 11, by which means the gear wheel 99 is displaced with the sleeve 83 and consequently also the displaceable nut 92 is displaced with the bar 52 and the feeler 49. This feeler 49 has now been moved in the direction of the arrow 69 through a distance corresponding to the path of the displacement of the sleeve 83. By the displacement of the gear wheel 99 its stud 102 has become disengaged from the recess 103 and the cooperation of the gear wheel 99 with the gear wheel 108 has been interrupted, so that now the counting carriage 3 and the stud carriage 10 will remain in their position shown in Fig. 9. During the displacing movement of the sleeve 83, however, the disc 84 with its apertures or recesses 86 and 87 has been pushed over the stud 82a of the tappet and over the stud 89, so that now both the main shaft 91 for the operation of the setting up or driving mechanism as well as the sleeve 83 are compelled to participate in the rotation of the shaft 79. By means of this rotating movement of the sleeve 83 the spring 96 is wound and the moveable nut 92 is moved in the direction of the arrow 69 by means of the exterior threads of the sleeve 83 and the cooperation of its arm 68 with a slot 93. In pursuance thereof the bar 52 which is guided in the arm 57 is also displaced in the direction of the arrow 69 together with the feeler 49.

The shaft 91 can be rotated, until it is again uncoupled by moving the sleeve 83 into the position corresponding to Fig. 10. This displacement of the sleeve 83 is effected in the following manner: Shortly before the termination of the second rotation of the shaft 91 the surface 54 of the feeler 49 strikes against the stud 18, whereby the bar 52 is compelled to move on in the direction of the arrow 69 independently of the feeler 49, compressing the spring 53 at the same time. In consequence thereof the tension of the spring 53 is increased to such an extent that it will arrest the moveable nut 92 and thereby causes the sleeve 83 and the gear wheel 99 to be pushed backwards. This causes the force of the soft flat spring 101 to be overcome and the gear wheel 99 with the sleeve 83 and the lever 107 to be returned to its position shown in Fig. 10. The registering or accumulating mechanism Z (Fig. 1), assuming that by means of the adjusting slides 2 the multiplicand 225 has been set has now made the following calculation:

$$-2 \times 225 \quad \frac{0.000\ 000\ 000}{\phantom{0.000\ 000\ }450} \text{ and indicates}$$
$$= 9.999\ 999\ 550,$$

while the revolutions counter U indicates as follows:

$$\frac{00.000.000}{99.999.998.} - 2$$

In consequence of the displacement of the sleeve 83 in which the movable nut 92, the bar 52 and the feeler 49 likewise participate, the disc 84 has released the tappet stud 82ª and the stud 89, the spring 96 becomes free to operate and turns the sleeve 83 back in the direction of the arrow 98, by which means the movable nut 92 and consequently the bar 52 and the feeler 49 are moved in opposition to the direction of the arrow 69 until the stud 94 has been moved into the path of the stud 95 so that the movable nut 92 as well as the bar 52 and the feeler 49 will now again assume their respective positions shown in Fig. 10 of the drawings. This movement, provided the spring 96 is sufficiently strong, will be effected very rapidly.

By the displacement of the sleeve 83 from its position shown in Fig. 11, into the position according to Fig. 10, the wheel 99 will be again adapted to operate the wheel 108, so that now the carriage is again fed one step and by this means the counting carriage 3 with the stud carriage will be moved into the position of the tens-digits in which position a stud 18 has been likewise adjusted. Inasmuch as an adding stud 23, however, has been set in this position, the sector 59 upon continuing the feeding of the two carriages will be first rocked into the position indicated at "A" in Fig. 9 by the engagement of its sliding surface 64 with the adding stud 23 and by this means the setting up or driving mechanism is adjusted for the adding operation by way of the bar 62. The same applies to the rotary counting mechanism. Immediately before reaching this position the adjusted tens-switching stud 24 acts moreover upon the wedge-shaped projection 66 of the sector 59 and rocks this sector through an additional distance into the position indicated at "A+1", in which position, indicated at "II" it is shown in broken lines in Fig. 9 of the drawings. In this operation the additional rocking movement has no influence upon the bar 62 and consequently upon the setting up or driving mechanism and upon the rotary counting mechanism inasmuch as on account of the connection 59c, 59f, 59d (Fig. 13) the lever 59 will only cause a simultaneous rocking movement of the lever 59d by means of the stud 59e, while the lever 59c is arrested by the stud 61. This additional rocking movement is merely for the purpose of rocking the bar 52 and consequently the feeler 49 to such an extent that now it is not its surface 54, but its surface 56 which is disposed opposite the value stud 18 which has been adjusted in the tens-row.

After all these movements have been completed, the feeding of the carriages is interrupted in the manner above described and the feeling members are now operated. Inasmuch, however, as the surface 56 is disposed to the rear of the surface 54 for the value of one stud division $e$, the main shaft 91 will not perform only two rotations, as correspond to the adjustment of the value stud 18, but three rotations, so that the registering or accumulating mechanism "Z" will now carry out the following calculation:

$$+3\times225 \quad \frac{9.999\ 999\ 550}{6\ 75} \text{ and indicates}$$
$$= 0.000\ 006\ 300.$$

while the revolutions counter U indicates as follows $$+\frac{99.999.998}{3}$$
$$=00.000.028$$

The feeling members are returned and the shifting of the carriage to the hundred-digit is thereupon started in the above-mentioned manner. At the beginning of this shifting movement of the carriage, the projection 66 engages over the tens shift stud 24 of the tens-digit whereupon, when the counting carriage 3 and stud-carriage enter the hundred-digit in which only an addition-stud 23 is adjusted, the sector 59 is swung out by the latter merely into the position "A" in which it is designated III in Fig. 9 in dotted lines. By means of this rocking movement there has been no action upon the registering or accumulating mechanism of the calculating machine, so that this mechanism will still be set for addition as before. But by this rocking movement the surface 54 of the feeler 49 has again been set opposite the value stud 18 which has been adjusted to the hundreds-digit position. After these movements have been completed, the feeding of the carriages is again interrupted and the feeling members are operated, whereupon the main shaft 91 performs two rotations and the registering or accumulating mechanism "Z" will now make the following calculation:

$$+2\times225 \quad \frac{0.000\ 006\ 300}{450} \text{ and will now indicate}$$
$$= 0.000\ 051\ 300.$$

while the revolutions counter U indicates as follows $$+\frac{00.\ 000.\ 028}{2}$$
$$= 00.\ 000.\ 228$$

After the feeling members have been returned to their normal position and the carriage has been fed, the setting up or driving mechanism is adjusted for "subtraction" by the adjusted subtraction stud 22 of the thousands-digit, and the sector 59 has now again assumed the position designated by the letter "S" and indicated in broken lines at IV in Fig. 9 of the drawings, the surface 54 of the feeler 49 being now opposite the value stud 17 of the thousands-digit. The main shaft 91 can now only perform one rotation, so that the registering or accumulating mechanism "Z" will now carry out the following calculation:

$$-1\times225 \quad \frac{0\ 000\ 051\ 300}{225} \text{ and will indicate}$$
$$= 9\ 999\ 826\ 300$$

while the revolutions counter U indicates as
follows $$-\frac{00.\ 000.\ 228}{1}$$
$$= 99.\ 999.\ 228$$

After the carriages have again been fed, the counting carriage and the stud carriage will move into the position for the ten-thousands-digits. Inasmuch as in this position both a subtracting stud 22 as well as a tens-switching stud 24 have been set, the sector 59 will be rocked into the position "V" indicated in broken lines in Fig. 9 and designated "S—1", by which means the setting up or driving mechanism and the revolutions counter are set for effecting the substraction and the surface 55 of the feeler 49 has been moved opposite the row of studs of the tenthousands-digits. Inasmuch as, however, the surface 55 is arranged in advance of the surface 54 for the distance of one stud division $e$, the main shaft 91 cannot now perform two rotations, as indicated by the value stud 18, but one rotation only, so that the registering or accumulating mechanism Z will now perform the following calculating operation:

$$-1\times225 \quad \frac{9.\ 999\ 826\ 300}{2\ 25} \text{ and will now indicate}$$
$$= 9.\ 997\ 576\ 300,$$

while the revolutions counter "U" will make the following indication:

$$-\frac{99.\ 999.\ 228}{1}$$
$$= 99.\ 989.\ 228.$$

After another feeding movement of the carriage has been effected, the sector 59, inasmuch as in the hundred-thousands-digit position a subtracting stud 22 and a tens switching stud 24 have likewise been set, retains its position corresponding to the tens thousands-digit, by which means in the hundred-thousands position instead of four rotations, as would correspond to the adjustment of the value stud 20, only three rotations are performed, so that the registering or accumulating mechanism "Z" will perform the following calculation:

$$-3 \times 225 \quad \begin{array}{r} 9.997\ 576\ 300 \\ 67\ 5 \\ \hline = 9\ 930\ 076\ 300, \end{array} \quad \text{and will indicate as follows}$$

while the revolutions counter "U" makes the following indication:

$$\begin{array}{r} 99.989.228 \\ -\quad 3 \\ \hline = 99.689.228. \end{array}$$

After the carriage has now moved into the million-digit positon, the sector 59 by the adding stud 23 and the tens switching stud sets in this position will again be moved into the position "A+1", by which means the setting up or driving mechanism and the revolutions counter are set for addition and the surface 56 of the feeler 49 is moved, so as to be opposite the million stud row. The main shaft will now not only perform one rotation to correspond to the adjustment of the value stud 17, but two rotations, so that the registering or accumulating mechanism "Z" will now carry out the following calculation:

$$+2 \times 225 \quad \begin{array}{r} 9\ 930\ 076\ 300 \\ 450 \\ \hline 0\ 380\ 076\ 300, \end{array} \quad \text{and will indicate}$$

while the revolutions counter "U" indicates as follows:

$$\begin{array}{r} 99.689.228 \\ +\quad 2 \\ \hline = 01.689.228. \end{array}$$

After an additional feeding of the carriage into the ten-million-digit position the sector 59, inasmuch as in this position only one adding stud 23 has been adjusted, is changed into the position "A", which, however, does not produce any change in the adjustment of the setting up or driving mechanism and the revolutions counter, but causes the surface 54 of the feeler 49 to be now positioned opposite the zero-stud 16 adjusted for the ten-million-digit. Inasmuch as, however, during the movement of the stud carriage into the ten-million position the wedge-shaped surface of the zero-stud 16 has already been made to act upon the surface 54 of the feeler 49, the spring 53 is prematurely tensioned for such an amount that the wheel 99 under the action of this spring will not reach the position shown in Fig. 11, but will be moved not higher than to the vertex point of the flat spring 101. By this means the coupling of the disc 84 with the studs 82a and 89 is prevented, so that there will be no rotation of the main shaft 91, and the wheel 99 by means of the flat spring 101 will be again thrown back into its position corresponding to Fig. 10, which will cause another feeding movement of the carriage to be directly initiated. Inasmuch as in the next higher position a zero-stud 16' is also adjusted, there will be no crank rotation corresponding to this position and the counting carriage and the stud carriage will be again fed forward, and the fixed zero-stud 16ᶠ which is always in the working position, will now act upon the feeler 49 and will likewise prevent the coupling with the main shaft 91. The three feeding movements of the carriage last mentioned have not performed any influence upon the product obtained by the working up of the million-digit in view of the fact that the main shaft 91 could not perform any rotary movements.

The operator is therefore now in position to read off the product obtained by the multiplication of the two factors 1.689.228 times 225 which appears in the registering or accumulating mechanism "Z" with the value 380.076.300, while the multiplier 1.689.228 becomes visible in the revolutions counter "U".

Thus, the counting carriage, if a zero-stud is disposed opposite the feeler 49, will not assume its position of rest, but it is immediately fed forward into the next digit position, so that in these cases there is a danger that the respective zero-stud may strike against the projecting surface 55 because the feeler 49 is unable to withdraw this surface rapidly enough. For this reason and as hereinbefore mentioned the zero-studs 16 are of reduced length, and in the same manner the surface 55 is made somewhat lower than the surfaces 54 and 56, so that the surface 55 cannot effect a feeling movement along the zero-studs, which is moreover unnecessary, because there is no movement of the registering or accumulating mechanism corresponding to a value less than zero. On the other hand, the feeling of the zero-studs by the surfaces 54 and 56 is absolutely necessary and is not interfered with by the hereinbefore mentioned arrangement of the zero-studs 16 with relation to the surface 55.

By the movement of the stud-carriage 10 into the position of the fixed zero-stud 16f the hook 14 has been rocked by the action of the projection 10a (Fig. 2) of the stud-carriage 10, so that the frame 7 with the stud carriage 10 is able to return to its upper terminal position under the influence of the spring 13. The stud 77f of the frame 7 (Fig. 1) has now also released the lever 77c, so that the spring 77b is now in position to return the lever 77 into the position corresponding to Fig. 10, and can lift the lever 77c and in consequence hereof the notches 113a of the bar 113b will become disengaged from the studs 113. At this moment, however, in view of the fact that by the raising of the frame 7 the stud carriage 10 has also become disengaged from the spur or stirrup 28a of the counting carriage 3, the spring casing not shown will become free to operate upon the counting carriage and will withdraw this carriage into its extreme left-hand position according to Fig. 1 in opposition to the spring action of the considerably weaker spring casing 113g.

By the movement of the stud carriage 10 into the position corresponding to the fixed zero-stud 16f the projection $l_x$ of the cancelling plate $k$ (Fig. 7) has also been moved against the member $m$ and in consequence thereof the cancelling plate is displaced in the direction of the arrow shown in Fig. 6a and all the pawls $e$ have been rocked anticlockwise, so that all the adjusted studs may now return into their position of rest under the action of the springs $c$. In case, however, the slide $m$ has not been adjusted to assume the position indicated in broken lines in Fig. 7, the cancelling plate $k$ is not displaced, so that the studs will, of course, remain in their adjusted positions. With this arrangement there is the advantage that, when a multiplying operation is to be carried out with several multiplicands and with one and the same multiplier, it is only necessary to set the multiplier once. At the same time, however, the entering movement of the stud carriage 10 has effected the rocking of the hook 14 as above described.

The stud 17f which in the additional digit position is fixedly disposed in its operating position is intended to serve the following purpose. If, for instance, the number-value of the multiplier to be adjusted is more than "5" in the ten-million position, it becomes necessary to supplement the full hundred millions in accordance with the abbreviated multiplying method employed. It is therefore necessary in such cases that the main shaft 91 in this additional digit makes one rotation which has to be worked up by the setting up or driving mechanism as an adding operation. It is for this reason that by this additional digit merely one adding stud 23*f* is to be employed which may be fixedly disposed in its working position the same as the value stud 17*f*. Inasmuch as in such cases in which the numbers of the ten million-digit of the multiplier to be adjusted are higher than 5, the setting up or driving mechanism in this position should always operate in a manner corresponding to a subtraction, the adding stud 23' is not set and there will be no adjustment of the zero-stud 16' connected thereto in the additional digit position, so that this zero-stud in such cases will not interfere with the feeling movement along the fixed stud 17*f*. In the position of the fixed zero-stud 16*f* no rotations at all of the main shaft 91 are performed, so that in this position there is no necessity of an adding or subtracting stud. This position serves merely for the rocking of the hook 14 and it consequently operates to arrest the driving shaft 79.

In the case of the Mercedes-Euklid-Calculating machine the setting up or driving mechanism is reversed by the sector 59 for the purpose of effecting subtraction. This will be necessary with all those calculating machines in which the subtraction is effected by adding the decadic supplement of the subtrahend. With other systems of machines the subtraction is, however, merely performed by the rotation of the main shaft 91 in the opposite direction. In order to attain this object the arrangement will be such that the sector instead of acting upon the setting up or driving mechanism may also operate a reversing gear by the actuation and reversal of which the desired direction of rotation of the main shaft 91 may be produced.

It will have to be understood that the invention is not to be limited in its scope to the particular form of embodiment herein shown and described by way of exemplification and of illustration of its principles only, but it may find expression in other embodiments, and modifications are possible within the purview of the invention, except as will otherwise appear from the scope and spirit of the appended claims.

I claim:

1. In a multiplying device for carrying out shortened or abbreviated multiplications by accumulated addition, a feeler, a setting up or driving mechanism, a multiplier setting mechanism including shifting studs, calculating studs as symbols for the digit values of the multiplier, and means for setting one calculating stud for each digit value of the multiplier at a distance from the feeler corresponding to the value of the digit to be set and for simultaneously setting certain of the shifting studs for controlling the method of calculation.

2. In a multiplying device for carrying out shortened or abbreviated multiplications by accumulated addition, a feeler, a setting up or driving mechanism, a multiplier setting mechanism including a shiftable carriage supporting shifting studs and calculating studs as symbols for the digit values of the multiplier, and means for setting one calculating stud for each digit value of the multiplier at a distance from the feeler corresponding to the value of the digit to be set and for simultaneously setting certain of the shifting studs for controlling the method of calculation, the stepwise shifting movement of said carriage during calculation being controlled by the cooperation of said symbols and said feeler.

3. A device as claimed in claim 1, characterized in that the feeler following a calculating operation is automatically returned so that during the calculating process the calculating studs remain unchanged and may be used with the same multiplier for making another calculation.

4. A device as claimed in claim 1, characterized in that the multiplier setting mechanism includes tens shifting studs each of which upon setting up a value greater than 5 is brought into operative position, said tens shifting studs determining together with the calculating studs during the calculating process the movements of the setting up or driving mechanism in the next higher digit.

5. A device as claimed in claim 1, characterized in that when adjusting a value greater than 5 one of said shifting studs for adjusting the setting up mechanism to subtraction is brought into operative position together with another of said shifting studs acting as a tens shifting member in the next higher digit.

6. A device as claimed in claim 1, characterized in that certain of the shifting studs constitute tens shifting members and are influenced by subtraction shifting studs of next lower digit.

7. A device as claimed in claim 1, characterized in that certain of the shifting studs constitute tens shifting members which add or subtract one movement relative to the number of movements of the setting up mechanism controlled by other of said studs according to whether the setting up mechanism is adjusted for addition or subtraction.

8. A device as claimed in claim 1, characterized in that the means for setting the studs includes keys, certain of the keys corresponding to the values 0 to 5 acting on the corresponding calculating studs and also on the shifting studs for producing additive operation of the setting up mechanism and other of said keys corresponding to the values 6 to 9 and acting on the corresponding calculating studs and on the shifting studs producing subtractive operation of the setting up mechanism.

9. A device as claimed in claim 1, characterized by the provision of a calculating stud adjacent the calculating digit stud of highest order permanently in operative position, an additive shifting stud permanently in operative position, and a zero stud not directly adjustable by the setting means.

10. A device as claimed in claim 1, characterized by the provision of a connection between one of the shifting studs associated with the digit of highest order and the zero calculating stud adjacent thereto.

11. A device as claimed in claim 2, characterized by the provision of means for selectively moving the carriage into operative position with respect to the setting means or the feeler.

12. A device as claimed in claim 2, characterized by the provision of spring means for holding the carriage during setting operation in operative position with respect to the studs and means for holding the carriage in calculating position following setting of the studs.

13. A device as claimed in claim 2, characterized by the provision of a counting carriage and means for coupling the stud carriage with the counting carriage during calculating operation.

14. A device as claimed in claim 2, characterized by the provision of driving means for the calculator, said driving means being automatically brought into action by moving the stud carriage into operative position with respect to the feeler.

15. A device as claimed in claim 1, characterized in that the feeler is provided with a plurality of parallel feeling surfaces.

16. A device as claimed in claim 1, characterized in that the feeler is provided with three different feeling surfaces arranged in step-wise relation, the step distance between the surfaces corresponding to the distance of two calculating studs disposed one behind the other.

17. A device as claimed in claim 1, characterized in that the feeler is provided with a plurality of steps, the middle step controlling the movement corresponding to the adjusted value to be transmitted to the setting up or driving mechanism, and two other of said steps controlling the movement to be transmitted to the setting up mechanism in consequence of tens transfer.

18. A device as claimed in claim 2, characterized by the provision of a plurality of steps on the feeler, the middle feeler step being normally in operative position and the two other steps are brought into operative position by adjusted tens shifting studs when the carriage enters a new calculating position according to whether an addition or subtraction shifting stud is set.

19. A device as claimed in claim 1, characterized by the provision of steps on the feeler, the shifting mechanism for the setting up mechanism including a shifting member operated by the shifting studs and connected with the feeler, the shifting member being swung with the feeler by the shifting studs when entering their calculating position so that in the operative position of a subtraction shifitng stud or addition shifting stud the middle feeler step is rendered operative, and in the operative position of a tens shifting stud with a subtraction or addition shifting stud the forward feeler step or the rearward feeler step is rendered operative.

20. A device as claimed in claim 2, characterized in that when the movement of the feeler is arrested by the calculating studs the carriage is actuated to bring a new group of calculating studs into the path of the feeler.

21. A device as claimed in claim 2, characterized in that the direction of movement of the setting up mechanism is controlled by the shifting member adjusting the feeler.

22. A device as claimed in claim 2, characterized by the provision of means for holding the carriage in lowered position, and means for releasing the holding means and simultaneously interrupting the operation of the device.

23. A device as claimed in claim 2, characterized in that the coupling members transmitting movement to the setting up mechanism simultaneously serve for moving the feeler.

24. A device as claimed in claim 1, characterized in that separate rows of calculating studs are provided for the values 0 and 5 and that for each two values, which by addition equal 10, one common row of studs is provided.

25. A device as claimed in claim 1, characterized in that the multiplier setting means includes key levers acting with one end immediately on the calculating studs and with the other end on a swingably mounted universal member, said member acting on said shifting studs.

26. A device as claimed in claim 1, characterized in that five calculating studs are associated with three shifting studs in one row on said carriage.

27. A device as claimed in claim 2, characterized by the provision of means for shifting the carriage step by step in one direction during operation of the setting means and means being operated on cooperation of the feeler with a calculating stud, said last named means being adapted to return said carriage in the opposite direction during calculation.

28. A device as claimed in claim 2, having a member common to all of the key levers for setting one or more shifting studs simultaneously with the setting operation of a calculating stud and a second member also common to all of the key levers, said second member being adapted for effecting step by step movement of the carriage incident to actuation of said studs.

29. A device as claimed in claim 2, characterized in this that on impingement of one of the feeling surfaces of the feeler against a calculating stud, the coupling members, transmitting the movement to the setting up or driving mechanism, are rendered inoperative, whereas the members for effecting the shifting movement of the counting carriage are rendered operative.

GUSTAV MEZ.